Patented July 13, 1948

2,445,121

UNITED STATES PATENT OFFICE 2,445,121

AIR-CONDITIONING SYSTEM

Kurt Nehab, Stretford, England, now by change of name Kenneth Emanuel Ney

Application December 29, 1942, Serial No. 470,458
In Great Britain January 9, 1942

12 Claims. (Cl. 257—3)

This invention relates to the controlling of air-conditioning plant, and like plant in which similar problems of temperature and humidity arise, e. g., in some forms of chemical plant. For simplicity's sake, it will be described in its application to air-conditioning plant only, but its other uses are not to be taken as excluded from the scope of the appended claims.

The usual elements of an air-conditioning plant are (a) a washing and cooling device, (b) damper means for regulating the rate of admission of air to the washing and cooling device, (c) a re-heating device for raising the temperature of the air leaving the washing and cooling device, (d) means for leading the conditioned air to the space to be conditioned, (e) means for returning air from such space back to the washing and cooling device for reconditioning, and (f) a pre-heating device for raising the temperature of any outside air drawn into the plant to mix with the returning air.

The principal object of the present invention is to provide a control device in which the several elements of the conditioning plant (or some of them) are subject to the independent but simultaneous control of two kinds of condition-responsive device, for example humidostat and thermostat.

A further object is to provide control apparatus in which the variation of either condition-responsive device beyond a pre-determined amount performs switching-over operations in a control circuit, altering the effect of variations in the other condition-responsive device.

A still further object of the invention is to provide means whereby, upon one of the regulating elements of the plant being moved by the control devices to its maximum (or minimum) position and remaining there for a short while, one or more other elements in the plant is or are placed in a condition of operation capable of dealing with the change of load, to ensure constant conditions being maintained in the conditioned enclosure and thus change the plant from summer to winter working (and vice versa) automatically when the air conditions so require.

Yet another object is to provide a dual control device in which simultaneous movements of two condition-responsive elements from normal, when in the same direction bring about opposed variations in the cooler and damper, but when in opposite directions bring about similar variations in the cooler and damper.

Other objects and advantages of the invention will become apparent from a perusal of the ensuing description and by reference to the attached drawings.

The present invention is applicable to a plant having a summer re-heating element (in addition to a winter re-heating element) as well as to a plant not having such an element; and in either case is applicable both to a single plant for dealing with air-conditions in one locality only and also to a plant having a central control and two or more subsidiary zone controls for dealing with air conditions in two or more localities where the respective loads or the desired air conditions are different.

In the accompanying drawings—

Figures 1, 2:
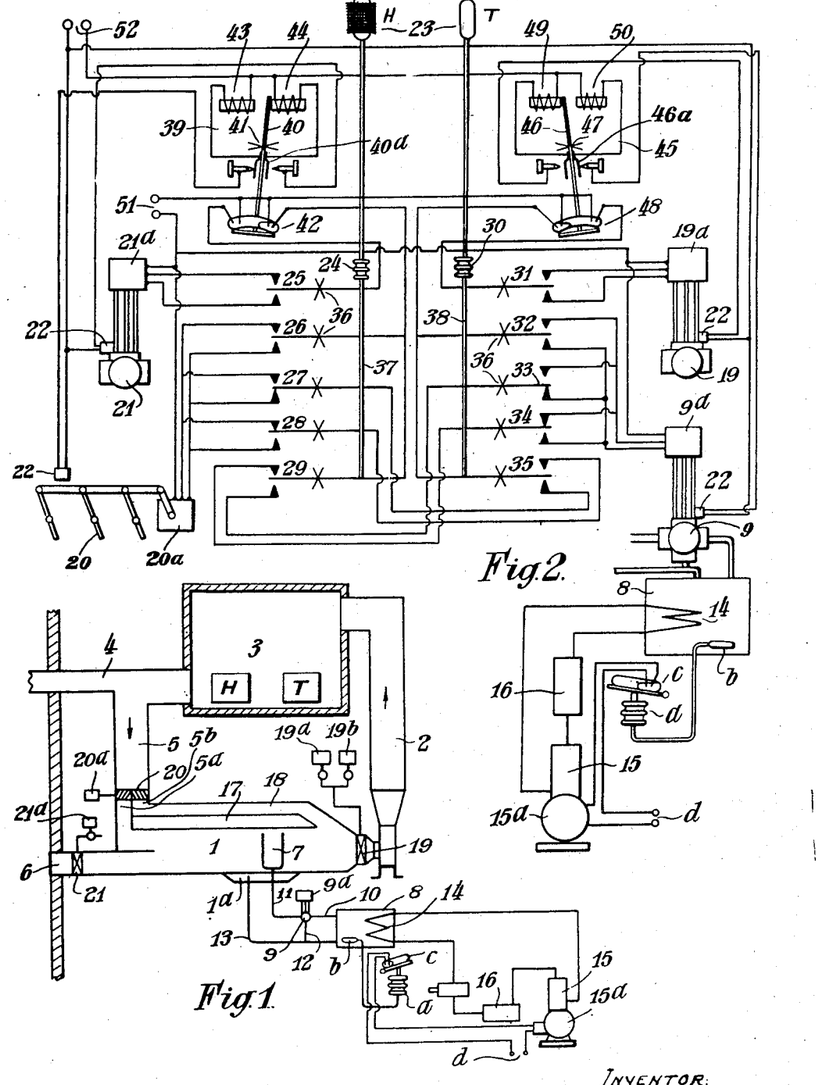
Fig. 1 is a schematic layout of the several elements of a single air-conditioning plant to which this invention may be applied, but omitting all electric circuits of the control system.
Fig. 2 is a wiring diagram for a single control system in which the re-heating element provided is for winter working, the several components being shown in the summer position.

Referring first to Fig. 1, the plant represented comprises the conditioning chamber 1, a duct 2 for conveying conditioned air to the receiving enclosure 3, an exhaust duct 4 leading from the enclosure 3 to the outside atmosphere, a return-air duct 5 connecting the duct 4 with the conditioning chamber 1 and an inlet 6 for outside air. In the conditioning chamber 1 is a washing and cooling element 7 of any suitable type, for example a bank of spraying jets, this element being represented as fed with cooled water from a tank 8, through a mixing valve 9, and that valve having a conduit 10 connecting to the tank 8, a conduit 11 connecting to the washing and cooling element 7 and a conduit 12 for returning to the element 7 water from the draining pipe 13 which leads from the sump 1ª of the condition chamber to the tank 8. The water in the tank 8 is adapted to be cooled by the expansion pipe 14 of a refrigeration system comprising a compressor 15 and a condenser 16.

The conditioning chamber 1 is divided by a partition 17 into two side-by-side compartments, one 18 of which forms a by-pass conduit to lead air from the return-air duct 5 towards the duct 2 without its having to pass through the cooling element 7. At the termination of the conditioning chamber 1, at the delivery end, is a re-heating device 19, with two independent, separately-controlled regulators. Across the return-air duct 5 is a damper 20 having two sets of vanes, one set being in the opposite direction to the other, but all being movable together in the same direction, one set of vanes controlling the air returning to the washing and cooling element 7 via the branch 5ª of the duct 5 and the other set controlling the air flowing into the by-pass compartment 18 via the branch 5ᵇ of the duct 5. These two sets of vanes are arranged in opposite directions so that, as their supporting spindles all rotate in the same direction simultaneously, one set opens as the other closes and vice versa.

A pre-heating element 21 is arranged in the inlet 6 for heating any outside air which may be admitted to the conditioning chamber 1.

The several component elements of the plant so far described for regulating the condition of the treated air, are known in themselves and also in various combinations. Accordingly, any engineer skilled in the art could select elements suitable for any particular problem of air conditioning. The present invention relates not to the elements themselves but to the manner in which they are controlled to give a co-operative result which is substantially constant at any pre-selected level.

Each of the several conditioning elements of the plant is provided with a reversible, modulating, operating motor, whereby it may be controlled to effect the desired regulation. That is to say, the mixing valve 9 has a motor 9ª; the re-heating element 19 has motors 19ª and 19ᵇ; the damper 20 has a motor 20ª; and the pre-heating element 21 has a motor 21ª. The compressor 15 has a motor 15ª.

Referring now to Fig. 2, one application of the improved control system is illustrated in more detail. The several conditioning elements 9, 19, 20 and 21 with their respective motors 9ª, 19ª, 20ª and 21ª are shown, and each has an end-switch 22 referred to below, to be operated when the element reaches and remains in one end position (the zero position, except in the case of the damper), as is explained later.

The primary control influences are received by the two air-condition-responsive devices H and T, shown at 23 the former being a humidostat and shown as a wet-bulb thermostat whilst the latter is a dry-bulb thermostat. Any other suitable humidostat may be used instead of the wet-bulb thermostat. Each of these condition-responsive devices H and T is arranged to operate a bank of five switches. The humidostat H through the expansion-contraction device 24 operates switches 25, 26, 27, 28 and 29 whilst the thermostat T through the expansion-contraction device 30 operates switches 31, 32, 33, 34 and 35. The expansion-contraction devices are themselves known in the art. They may be adjustable to vary the limits at which the variation of air condition will actuate the switches.

In the drawing (Fig. 2) the several parts are shown in the stationary condition for summer working, in which state the conditioned air has the correct degree of humidity and is at the required temperature, as determined by the setting of the two air-condition-responsive devices. As shown, on the humidity side (left hand side in Fig. 2), switches 25, 26 and 29 are open, switch 27 is in contact at the bottom and switch 28 is in contact at the top. On the temperature side (right hand side in Fig. 2) switches 31, 32 and 35 are open, switch 33 is in contact at the bottom and switch 34 is in contact at the top. The switches are two-way make-and-break switches of suitable type and their levers, shown pivoted at the several points 36 are connected with the respective expansion devices 24, 30 through the rods 37, 38. The connections with those rods will usually be of a flexible nature, or some other resistance will be introduced, to ensure a good contact in all of them, even though some may close slightly earlier than others.

In more detail, on the humidity side, switch 25 is in the circuit of the motor 21ª of the pre-heater 21; switches 26, 27 and 28 are in parallel circuits with the motor 20ª of the damper 20; and switch 29 is in circuit with the closed switches 33 and 34 on the temperature side. On the temperature side, switch 31 is in the circuit of the motor 19ª of the re-heater 19 (in this case a single re-heater with single control); switches 32, 33 and 34 are in parallel circuits with the motor 9ª of the mixing valve 9; and switch 35 is in circuit with the closed switches 27 and 28 on the humidity side. For the motor 15ª of the compressor 15 shown in Fig. 1, there is an independent control switch, comprising the contraction-expansion device $a$ connected with a thermostat $b$ in the tank 8, such device $a$ operating a tiltable mercury switch $c$ in circuit with the motor 15ª to energise the motor whenever the demand for cooled liquid from the tank 8 is such as to require the cooling effect of the compressor system. This circuit for the compressor units $a$, $b$, $c$ is quite independent of the switching circuits, and receives current at the terminals $d$.

Associated with the bank of switches 25—29 on the humidity side is a two-way relay 39, the pivoted armature 40 of which is insulated below the pivot 41 and carries at its lower part the mercury switch 42, the armature being under the control of the magnet coils 43 and 44; whilst associated with the bank of switches 31—35 on the temperature side is a further two-way relay 45, the pivoted armature 46 of which (also insulated below its pivot 47), carries the mercury switch 48, the armature being under the control of the magnet coils 49 and 50. The magnet coils 43, 44 are connected with a contact member 40ª on the armature 40 by which the movements of the armature brings them into and out of circuit, and similarly the magnet coils 49, 50 are connected with a contact member 46ª on the armature 46. In known manner, the coils of the relays are de-energised as soon as the armature moves towards them, since the contacts 40ª and 46ª break the circuits.

All the switches so far described, and appearing in Fig. 2, namely, the bank of humidity-controlled switches 25—29 the bank of temperature-controlled switches 31—35 and the mercury switches 42 and 48 are connected in a common circuit (which may be called an operating circuit) receiving direct current from any suitable source at the terminals 51.

The magnet coils 43, 44 of relay 39, and the magnet coils 49, 50 of the relay 45 are in a separate circuit (which may be called a distribution circuit) receiving direct current from any suitable source at the terminals 52 and such separate circuit includes the several end switches 22 of the respective conditioning elements namely, mixing valve 9, re-heater 19, damper 20 and pre-heater 21. All the switches 22 incorporate delayed-action mechanism of suitable form (several are known in the art) and do not become operative until the respective elements have remained in an end position for some time. When an end switch 22 does operate, it affects a circuit to one or other of the relay coils 43, 44, 49 and 50, as the case may be, and as described fully below, the energising of which coils operates the appropriate armature 40 or 46 to re-arrange the operating circuit by tilting the respective mercury switch 42, 48, so that the desired air conditions may be restored in the chamber 3. When such conditions are restored, and the control is again stationary, the several regulating elements will usually be away from their end positions.

In Fig. 2, the tilting switch 42, when in the position shown, to which it has been brought by the relay coil 44, is operative to complete parallel connections to the levers of switches 26 and 29; and when in the opposite position to which it would be brought by the coil 43 it will complete a connection to the lever of switch 25. The tilting switch 48 when in the position shown, to which it has been brought by the relay coil 49, is operative to complete parallel connections to the levers of switches 32 and 35; and when in the opposite position, to which it would be brought by the coil 50, it will complete a connection to the lever of switch 31.

Of the various end switches 22 that of the mixing valve 9 is in series with the right-hand coil 50 of relay 45, through the contact member 46ª; that of the reheater 19 is arranged for series connection with the left-hand coil 49 of relay 45 again through the contact member 46ª and that of the pre-heater 21 is adapted for series connection with the right-hand coil 44 of relay 39. The end-switch 22 of the damper 20 is in series with the left-hand coil 43 of relay 39. The damper end switch 22 operates at the maximum adjustment (full-open) of the damper, whereas all the other end switches operate at the zero adjustment.

It will be seen that of the four conditioning elements 9, 19, 20 and 21 one pair (namely 20 and 21) is under the control of one relay (namely, 39), and the other pair is under the control of the other relay. In each pair (20, 21 and 9, 19) the arrangement is such that if either unit reaches that end of its adjustment effective on the respective end switch 22, and remains there, it brings the other unit into operation, through the consequent actuation of the relay-operated switch. This reversible or oscillatory relationship in the two pairs of units may be tabulated as follows:

In the first pair, the damper end switch 22 when actuated at the full-open position makes the pre-heater 21 operable, and the pre-heater end switch 22 when actuated at the zero position makes the damper operable. In the second pair, the cooler end switch 22 when actuated at the zero position makes the re-heater 19 operable, and the re-heater end switch 22 when operated at the zero position makes the cooler operable. The actual operations of the motors of those units made operable by the end switches, are of course subject to the positions of the switches 25—29 and 31—35.

The operation of this embodiment of the invention is as follows:

As above stated, the elements are shown in a stationary condition for summer working, no part of the operating circuit being closed, and the several reversible modulating motors therefore being idle. Should there be a rise in temperature without alteration of humidity, the expansion-contraction device 30 of the thermostat T operates to move the levers of switches 31, 32, 33, 34 and 35 in an anti-clockwise direction simultaneously. Switch 34 is already closed on the top side, so that no change is effected there, but all the other switches will, sooner or later, close on the top side and, if themselves "live" will thereby complete the respective branches of the operating circuit. For example, switch 31 is dead owing to the position of the tilting switch 48; switch 32 will energise the motor 9ª of the mixing valve 9 to increase its cooling effect; and switch 33 is dead, owing to the switch 29 on the humidostat side, with which it is connected, being in a neutral position, but its change from bottom to top closing alters the directional possibilities of any closing of such switch 29. As above stated, switch 34 is dead because of its connection with the neutral switch 29 on the humidostat side. Switch 35 will form a connection on its top side with closed switch 28 on the humidostat side to energise the motor 20ª of the damper 20 to close the damper in order to permit less air to pass through the conditioning chamber. The total effect therefore of a rise in temperature without change of humidity during summer working is to cut down the air flow through the conditioner and to give an increased cooling treatment to the reduced quantity of air passing through the conditioner. In the case of a decrease in temperature during summer working and a reverse movement of the switches 31—35 the effect can be traced out in the drawing, but may be summarised as a reduction in the cooling effect of mixing valve 9, and an increase in the volume of air admitted to the conditioner.

On the other hand, should there be a rise in humidity without alteration of temperature, the expansion-contraction device 24 of the humidostat H operates to move the levers of switches 25, 26, 27, 28 and 29 in a clockwise direction simultaneously. Switch 28 is already closed on the top side, so that no change is effected there, but all the other switches will, sooner or later, close on the top side and if themselves "live" will thereby complete the respective branches of the operating circuit. For example, switch 25 is dead owing to the position of the tilting switch 42; switch 26 will close on the top side to energise the motor 20ª of the damper 20 to close it to permit less air to pass through the conditioning chamber; switches 27 and 28 are dead as switch 35 of the thermostat side is in a neutral position; and switch 29 will form a connection with the closed switch 34 on the thermostat side, to energise a motor 9ª of the mixing valve 9 to increase its cooling effect. The total effect therefore of an increase in humidity without alteration of temperature during summer working is to restrict the flow of air through the conditioner and to cool it still further. In the case of a decrease in humidity, and a reverse movement of the switches 25—29, the effect can be traced out in the drawing but may be summarised as an increase in the flow of air to the conditioner and a decrease in the cooling effect of the mixing valve.

Upon the operation of any of the conditioning elements (damper, cooler, re-heater, etc.) as above suggested, the air conditions in the receiving chamber 3 will of course vary accordingly and, when the desired conditions have been restored in that chamber, the condition-responsive devices H and T will return to their normal positions, bringing the switches 25—29 and 31—35 back to the stationary conditions as shown, with the conditioning elements in the positions to which the operation of the switches brought them. It will be observed that, each of the two air-condition-responsive devices H and T functions independently of the other; that is to say, each will function whether the other is functioning simultaneously or not; and also that they may function simultaneously when conditions so require. Consequently, on the one hand the conditioning elements of the conditioning plant, and in particular the damper and the mixing valve, are subject to the simultaneous control of two independently-operating air-condition-responsive devices; and on the other hand each of the condition-responsive devices operates the damper switches and the cooler switches simultaneously. This is one of the new and basic principles of the present invention. Other control systems are known, in which one conditioning element has been subject to the influence of one or even two condition-responsive devices and another conditioning element has been subject to the influence of only one condition-responsive device, but the present invention is believed to be the first proposal for the simultaneous control of damper and mixing valve (the term mixing valve embracing other cooling devices as hereinafter explained) by two independently-operating air-condition-responsive devices.

Whilst the effects of the operations of the humidostat and thermostat have been described separately, it will be realised that in many cases those condition-responsive devices will be influenced by the respective conditions simultaneously, sometimes in the same direction (increase or decrease) and sometimes in opposition, so that their aggregate result must be taken into account. If, however, air conditions occur which cause the devices H and T to be influenced in opposite directions, their aggregate effect on the condition-varying units may be illustrated as follows.

Should the air conditions in the enclosure 3 become, for example, such that the temperature is too high whilst the humidity is too low, the interconnection between the switches 25—29 of the humidostat side and the switches 31—35 of the thermostat side, which is brought about on the one hand by switch 29 connecting to switches 33 and 34, and on the other hand by switch 35 connecting to switches 27 and 28, modifies the total effect on the control operations on the conditioning element. In such a case (i. e., temperature too high and humidity too low) the damper 20 will receive an opening impulse whilst the cooler 9 will receive an increased-cooling impulse. That is to say, switch 32 when closed on the top side will energise motor 9ª of the mixing valve 9 to increase its cooling effect whilst switch 29 will close on the lower side and establish a current to switch 33 which closes on the top side and will in turn energise motor 9ª of mixing valve 9 to increase the cooling effect. Switch 34 would be dead, because switch 29 with which it is interconnected would be open on the top side. Switch 35 will close on the upper side feeding current to switch 28 which is closed on the lower side and therefore energises motor 20ª of damper 20 to increase the quantity of air passing through the conditioning chamber. Switch 27 will be dead because switch 35 with which it is interconnected would be open on the bottom side. Switch 26 will close on the lower side and would energise motor 20ª of damper 20 to increase the quantity of air passing through the conditioning chamber, whilst switches 25 and 31 would be dead owing to positions of the tilting switches 42 and 48. The total effect therefore of an increase in temperature and a decrease in humidity occurring simultaneously would be to increase the quantity of air admitted to the conditioner and to increase the cooling effect upon it.

As stated above, simultaneous operation of the two air-condition-responsive devices H and T may be in the same direction ( i. e., both increasing or both decreasing) or may be in opposite directions (i. e., one increasing and the other decreasing). It is another of the new and basic principles of the present invention that the switching systems which are under the control of the two air-condition-responsive devices are so interconnected as to take care of the plant both for similar and for opposed simultaneous variations of air condition, and are interconnected in such a way that similar simultaneous variations bring about opposed operations of the conditioning elements (e. g., increase of air admitted to conditioner and decrease of cooling effect) whilst opposed simultaneous variations bring about similar operations of the conditioning elements (e. g., increase of air admitted to conditioner and increase of cooling effect).

Should the operation of a conditioning element as above described be insufficient to restore normal air conditions when at its minimum, having moved to its end position, the respective end switch 22 will, after the pre-determined time lag, operate to change over the corresponding relay 39 or 45 in the distribution circuit to set up winter conditions. In such a case, the effects of some or all of the various switches 25—29 and 31—35 in the operating circuit will be changed. For example, if the mixing valve 9 reaches and remains in the end position representing minimum cooling effect all the switches 31—35 being closed on the bottom side because of contraction of the member 30, and if still less cooling is required, below the amount which is necessarily connected with washing the air with re-circulated water, the associated end switch 22 will operate the corresponding relay 45 to bring the re-heating means 19 into operation, the switch 31 then being "live" because of the new position of the tilting switch 48. Similarly, if the re-heater 19 reached and remained in an end position (closed) the associated end-switch 22 would operate the relay 45 to bring the mixing valve 9 into operation, the switches 32 and 35 then being "live" owing to the new position of the tilting switch 48. Other variations between summer and winter working may be traced out in the drawing.

The arrangement so far described includes only one re-heating operation with a single control therefor. As already stated however, there may be a second regulator for the re-heater, with separate control (Fig. 1) or a single re-heater with two independent controls (Fig. 2). Such an arrangement is described below, but it may be mentioned first that whilst the conditioning elements (cooler, damper, heater) have been spoken of as adjustable between zero and a maximum, in some small plants some of them may be fitted with "on-off" switches without intermediate adjustment, and yet be subject to the simultaneous but independent control of a humidostat and a thermostat.

Figure 3:
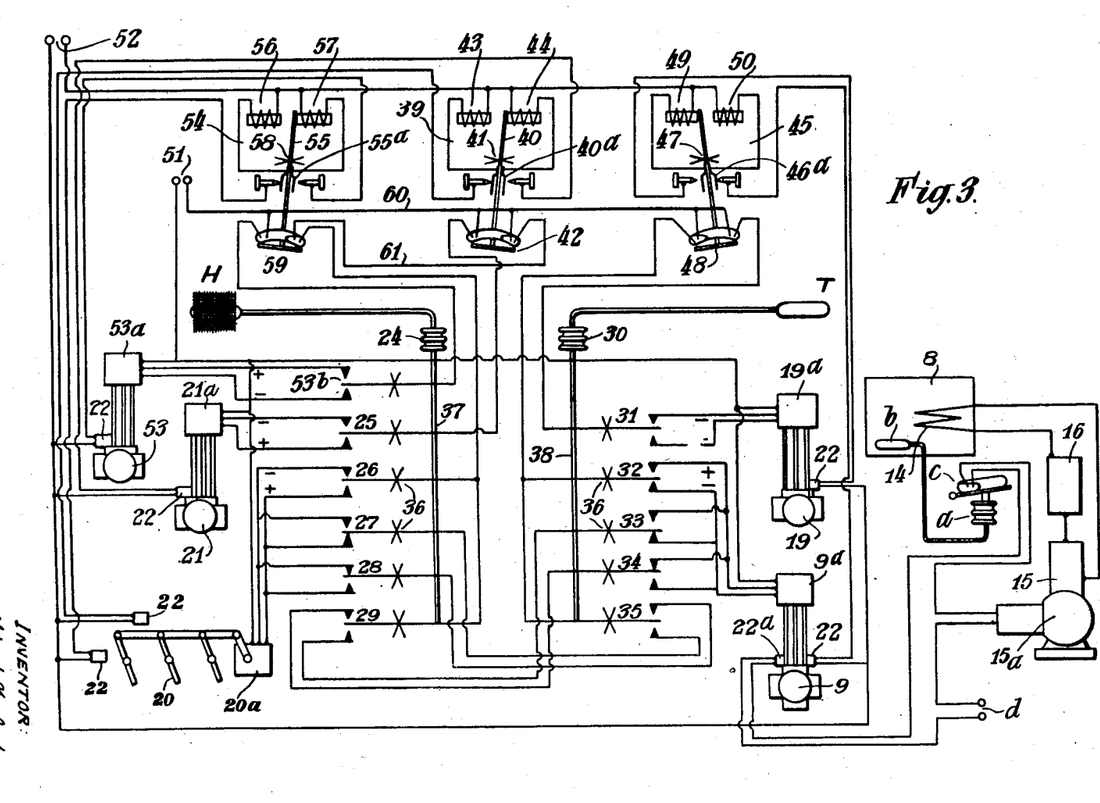
Fig. 3 is a further wiring diagram for a single control system but in which there are two regulators for the re-heating element, namely one for winter working and one for summer working, the component parts here also being shown in the summer position.

Referring to Fig. 3, there are two regulators for the re-heater 19 corresponding to that shown in Fig. 2, and summer re-heater 53 which is additional to the arrangement of Fig. 2 and has a reversible modulating operating motor 53ª at an end switch 22. There is also an additional switch 53ᵇ in the bank of switches on the humidity side of the operating circuit, and an additional two-way relay 54 in the distribution circuit, this relay having an armature 55, coils 56 and 57, pivot 58 and contacts 55ª and the armature carrying the tilting mercury switch 59. The additional switch 53ᵇ is in the circuit of the summer re-heater 53 and is normally (i. e., in stationary conditions) open, as shown. With the parts in stationary summer condition as shown, the additional switch 53ᵇ is dead, owing to the position of the additional tilting switch 59. Upon a rise in humidity, causing the switch levers of the humidity side to move in a clockwise direction owing to expansion of the member 24, the switch 53ᵇ becomes closed on the top side, but is inoperative so long as the additional relay remains in the position shown. The switches 31—35 (on the thermostat side) are connected up exactly as in the embodiment of Fig. 2 as also are the switches 27 and 28 in the humidostat side. The switches 26 and 29 connect with the additional tilting switch 59 (right hand end) instead of with the tilting switch 42. The left hand end of all three tilting switches 59, 42 and 48 and the right hand end of the switches 42 and 48 are connected directly with a common feeder 60, whilst the right hand end of switch 59 can only be connected with that feeder through the link 61 with the right hand end of switch 42. Accordingly, switches 26 and 29 remain dead unless both relays 39 and 54 are in the summer position.

In the distribution circuit of this embodiment there are two end switches 22 for the damper, one operating at the fully-open position and the other at the fully-closed position. Also the end switch 22 of the additional re-heater valve is in series with the right hand coil 57 of additional relay 54, whilst the left hand coil 56 of that additional relay is in series with the end switch 22 operating at the fully-closed position of the damper 20. Left-hand relay coil 43 of relay 39 is in series with the end-switch 22 operating at the fully-open position of the damper; whilst right hand relay coil 44 of the same relay 39 is in series with the end switch 22 of the pre-heater 21. Left-hand relay coil 49 of relay 45 is in series with the end switch 22 of the re-heater 19; and right hand relay coil 50 of the same relay 45 is in series with the end switch 22 of the mixing valve 9. This mixing valve has a second end switch 22ª in series with the motor 15ª of the compressor 15, through the tilting mercury switch c which is independently controlled by the thermostat b in the tank 8. Current for the motor 15ª is supplied from any suitable source at the terminals d.

The operation of this embodiment is similar to that shown in Fig. 2, with the addition that the re-heater 53 is brought into operation by the additional relay 54 when re-heating during summer working is required. The system is shown in the summer position, both re-heaters being "dead" because of the positions of tilting switches 59 and 48.

The co-operative functioning of the elements for various changes of load may be traced out from the drawing with the aid of the following summary:

(a) If the humidity remains constant and the temperature becomes too high, the damper 20 will receive a closing impulse through the switches 48, 35 (closed at the top side) and 28 (closed on the top side) and also the mixing valve 9 will receive an increased cooling impulse from the switches 48 and 32 (closed on the top side). In the course of this operation the dew-point temperature of the conditioned air will decrease;

(b) If the temperature remains constant and the humidity increases, the damper 20 will receive a closing impulse through switches 42, 59 and 26 (closed on the top side) and the mixing valve 9 will receive an increased cooling effect through the switches 42, 59 and 29 (closed at the top side) and 34 (closed on the top side). Here again the dew-point temperature of the conditioned air will decrease;

(c) If the humidity remains constant and the temperature becomes too low, the damper 20 will receive an opening impulse through switches 48, 35 (closed on bottom side) and 27 (closed on bottom side) and the mixing valve 9 will receive a decreased cooling impulse from switches 48 and 32 (closed on bottom side). Here also, the dew-point temperature will increase;

(d) If the temperature remains constant and the humidity becomes too low the damper 20 will receive an opening impulse through switches 42, 59 and 26 (closed on bottom side) and the mixing valve 9 will receive a decreased cooling impulse from the switches 42, 59, 29 (closed at the bottom side) and 33 (closed on bottom side). Here again the dew-point temperature will increase;

(e) If the temperature becomes too high whilst simultaneously the humidity becomes too low, the damper 20 will receive an opening impulse through switches 42, 59 and 26 (closed on bottom side) and by an alternative path through switches 48, 35 (closed on top side) and 28 (closed on bottom side) whilst the mixing valve will receive an increased cooling impulse through switches 42, 59, 29 (closed on bottom side) and 33 (closed on top side), and by an alternative path through switches 48 and 32 (closed on top side). Here, the dew-point temperature will decrease;

(f) If the temperature becomes too low whilst simultaneously the himidity is too high, the damper 20 will receive a closing impulse through switches 42, 59 and 26 (closed on top side) and by an alternative path through switches 48, 35 (closed on bottom side) and 27 (closed on top side) whilst the mixing valve 9 will receive a decreased-cooling impulse through switches 48 and 32 (closed on bottom side) and by an alternative path through switches 42, 59, 29 (closed on top side) and 34 (closed on bottom side). Here the dew-point temperature will increase;

(g) The damper 20 will begin to move from its fully-open position if the pre-heater 21 has remained closed long enough to actuate its end switch 22, and conversely the pre-heater 21 will be brought into operation if the damper 20 remains fully-open long enough to actuate its end switch 22;

(h) The damper 20 will begin to move from its fully-closed position if both the summer re-heater 53 and the pre-heater 21 have remained closed long enough to actuate both the respective end switches 22, and conversely the summer re-heater 53 will be brought into operation if the damper 20 remains in the fully-closed position long enough to actuate its end switch 22; and (i) The cooler 9 will be put into operation if the winter re-heater 19 remains in its closed position long enough to actuate its end switch 22, and conversely the winter re-heater 19 will be brought into operation if the cooler 9 remains closed long enough to actuate its end switch 22.

It must be understood that where a mixing valve is referred to, that is only one form of cooling device which may be adopted, and the various operations could be carried out equally well if some other cooling device were substituted for the mixing valve 9 or if the cooling source is controlled directly, instead of the cooling medium being regulated.

In the above synopsis of operations, the dew-point temperature of the conditioned air is referred to. In control arrangements already known for air-conditioning plant, the dew-point temperature of the air leaving the cooling device is either kept constant, regardless of varying loads, or is moved to the lowest limit when the loads increase above normal. Dew-point control is used in these known arrangements when all or some of the conditioning elements are operated directly by a dew-point thermostat inserted behind the conditioner, with the object of keeping the dew-point temperature constant. If the operating thermostat is located in the conditioned room, or in the return air duct, it will operate one or more of the conditioning elements of the plant, with the effect, e. g., to lower the dew-point temperature when the loads are increasing as indicated by a rise of temperature and humidity in the enclosure.

The present invention can operate without controlling the dew-point temperature at a constant level, and is therefore much more convenient to operate. Control of dew-point temperature can be effected if desired. In response to the control movements described above the dew-point temperature will increase during control operations which are being performed when either inside temperature or inside humidity is too low and, vice versa, will decrease during control operations when either of those variables is too high. The highest dew-point temperature will be reached when outside loads are high and inside moisture load does not occur or is very small. As known per se the inside moisture load originates mostly from occupants.

Figure 4:
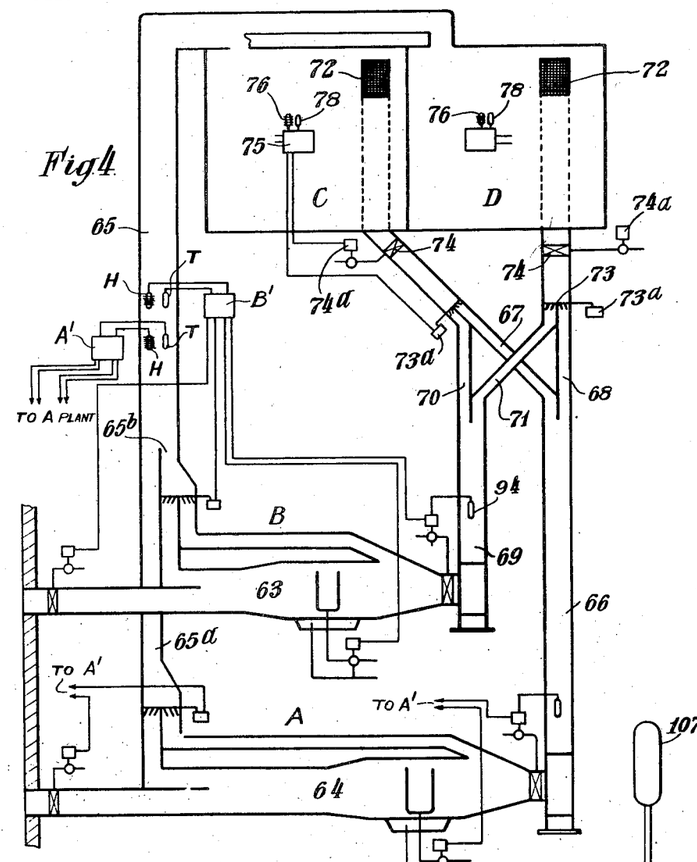
Fig. 4 is a schematic layout of the several elements of a plant having a central control and two subsidiary zone controls.
Figure 5:
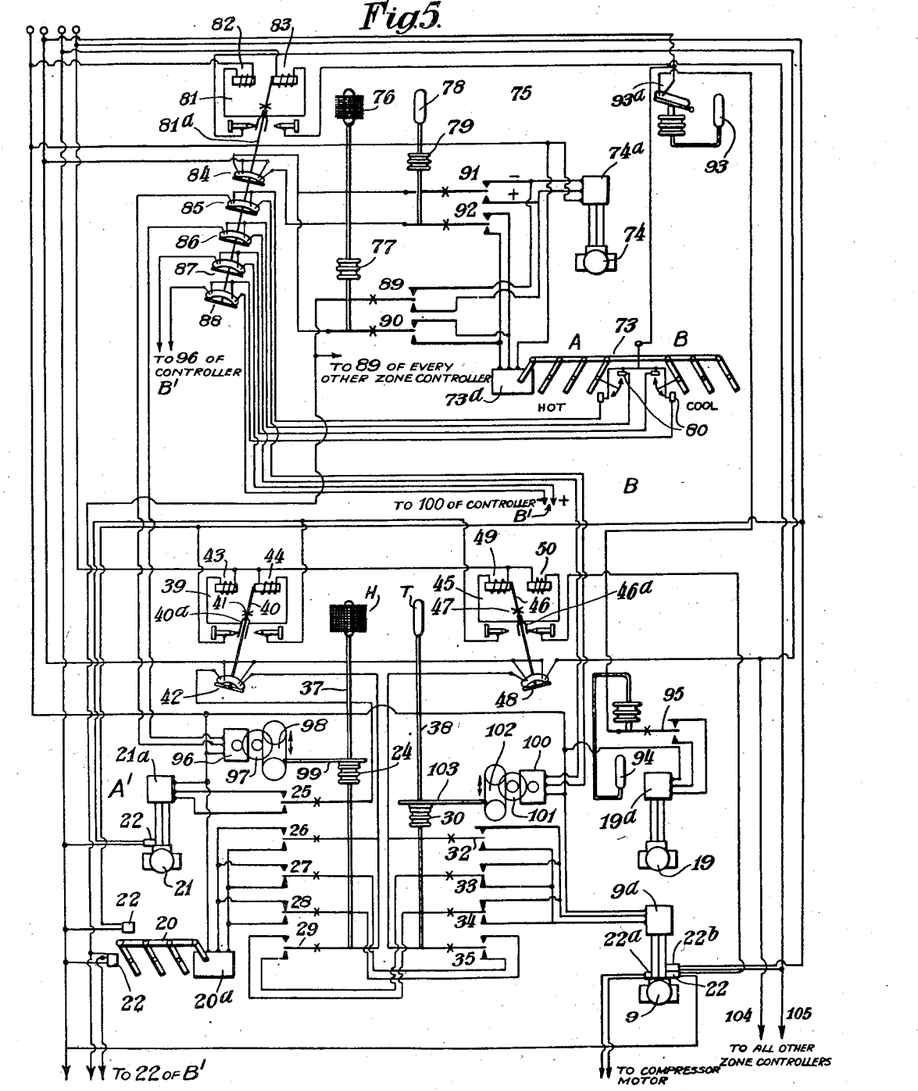
Fig. 5 is a wiring diagram for the plant represented in Fig. 4.

Referring now to Figs. 4 and 5, one application of the invention to zone control is illustrated. If a number of different zones require to be conditioned independently, say where there are different demands on the air conditions, or wide variations of load, at least two conditioning plants are required each controlled in accordance with my invention (e. g., each controlled as illustrated in Fig. 2) but one plant at least will be set to produce higher and the other plant or at least one other set to produce lower air conditions than those actually required in any zone, and each zone will be furnished with its own control apparatus for regulating the proportions in which the two grades of conditioned air are to be mixed together for that zone. As shown in Fig. 4 there are two main conditioning plants A (63) and B (64), controlled respectively by the main controllers $A^1$, $B^1$, each of which, though not shown in detail, is substantially according to the embodiment of this invention already described with reference to Fig. 2; differences being that the re-heater 19 is separately controlled and certain additions are provided as described below. The air-condition-responsive devices H and T of said main controllers $A^1$, $B^1$ are placed in the main return duct 65 through which air flows from all the conditioned zones back to the conditioning plants, the duct dividing into branches $65^a$ and $65^b$ for that purpose. Two zones C, D are shown, but in practice there may be two or more than two. The main controls $A^1$, $B^1$ have their respective air-condition-responsive devices H and T pre-adjusted to produce respectively an air of higher temperature and humidity and an air of lower temperature and humidity than that desired.

The conditioned air from the main plant A (Fig. 4) enters the duct 66, which divides into a branch 67 leading to zone C, and a branch 68 leading to zone D. Similarly, conditioned air from the main plant B enters the duct 69, which divides into a branch 70 leading into the said branch 67, and a branch 71 leading into the said branch 68, the respective united branches continuing to the outlets 72 which open into the zones C, D. There would, in practice, be as many branches of the ducts 66 and 69 as there were zones to be conditioned.

At each point where a branch from the duct 66 of the main plant A joins a branch from the duct 69 of the main plant B, a mixing damper 73 is arranged, each having a reversible, modulating, operating motor $73^a$, and each damper has those of its vanes opposite one branch, in the contrary direction to those opposite the other branch, so that, as all the vanes move together, one branch is closed as the other is opened, and vice versa. Also, in each compound branch beyond the mixing damper 73 is a re-heater (herein called a booster heater) 74 with its reversible, modulating, operating motor $74^a$. In each zone, C, D is a zone-controller 75, one of which, along with one of the main controllers, is shown in detail in Fig. 5.

Referring to Fig. 5, which shows one central controller and one zone controller only, in the zone-controller is a humidostat 76 with expansion-contraction device 77, and alongside it is a thermostat 78 with its expansion-contraction device 79. The booster-heater 74 with its operating motor $74^a$, and the mixing damper 73 with two sets of end switches 80, are also shown. There is a single relay 81 having coils 82 and 83, the former of which is in series with the right hand end of the tilting switch 48 in the main controller, and the latter of which is in series with an additional end switch $22^b$ on the mixing valve 9 of the main controller. This relay 81 has an extended armature $81^a$ carrying five tilting mercury switches 84, 85, 86, 87 and 88.

The expansion-contraction device 77 of humidostat 76 is connected to the levers of two make-and-break switches 89, 90, the first of which, 89, controls the motor $74^a$ of the booster-heater 74 and the second of which, 90, controls the motor $73^a$ of the mixing damper 73. The expansion-contraction device 79 of the thermostat 78 is connected to the levers of two further make-and-break switches 91, 92 the first of which, 91 also controls the motor 74ᵃ of the booster-heater 74, and the second of which, 92, also controls the motor 73ᵃ of the mixing damper 73. There are two further thermostats 93, 94 of which 93 is in the respective zone, and 94 is just behind the main plant. Thermostat 93, operates a tilting mercury switch 93ᵃ connected electrically to the lever of a make-and-break switch 95 controlling the motor 19ᵃ of the winter re-heater 19 in the main controller, and the thermostat 94 is connected mechanically to that lever.

The thermostat 94 will be placed in the conditioned air duct 66 or 69, immediately behind the re-heater 19 and will be set so as to operate the switch 95 when the temperature of the heated air from the main plant falls below a preselected minimum. The tilting switches 94 of the several zones will be connected in parallel with each other, and all of them in series with switch 95. This means that switch 95 is ineffective unless both the thermostat 94 and any one or more of the thermostats 93 has functioned.

Reverting for a moment to the central controller A¹ shown in Fig. 5, the rods 37, 38 of the two banks of switches, in addition to being directly influenced by the air-conditioned-responsive elements H and T are each adapted to be influenced mechanically by a mechanism under the control of the zone controller. As shown, on the humidity side of main controller A¹ is a motor 96, a reduction gearing 97 (which may be a variable speed gearing) and a traversing device 98 connected by link 99 to the expansion-contraction element 24. On the temperature side there is a similar motor 100, reduction gearing 101, and a traversing member 102 connection by link 103 to the expansion-contraction member 30.

Of the five tilting switches 84–88 on the extended armature 81ᵃ of the relay 81 in the zone controller, the first (uppermost) 84 is connected at the left-hand side with the lever of make-and-break switch 91 of the booster heater, and the make-and-break switch 90 of the mixing damper 73 and at the right-hand side with the make-and-break switch 92 of the mixing damper 73; the second is connected at the left-hand side with the motor 96 in the main controller A¹, and with one end switch 80 on the mixing damper 73 (operating at open position of damper) and at the right-hand side with the motor 100 in the main controller A¹ and with the same end switch 80 of the mixing damper; the third is connected at the left-hand side with the motor 96 in the main controller A¹ and with another end switch 80 on the mixing damper 73 (operating at closed position of damper) and at the right-hand side with the motor 100 in the main controller A¹ and with the same end switch 80 of the mixing damper; the fourth is connected at the left-hand side with the motor 96 of main controller B¹ (not shown in Fig. 5) and with another end switch 80 on the mixing damper 73 (operating at closed position and damper) and at the right-hand side with the motor 100 of main controller B¹ (not shown in Fig. 5) and with the same end switch 80 of the mixing damper; whilst the fifth is connected at the left-hand side with motor 96 of main controller B¹ and with a fourth end switch 80 on the mixing damper 73 (operated at open position of damper) and at the right-hand side with motor 100 of main controller B¹ and with the same end switch 80 on the mixing damper. These various connections are of course either "live" or "dead" according to the position of the armature 81ᵃ.

It will now be seen that, if the mixing of two air streams at one of the mixing dampers 73 is inadequate to satisfy the requirements of air condition in the respective zone, the appropriate end switches 80 will establish a current to the complementary tilting switches, which, in turn, will affect the motors 96 and 100 of the main controllers A¹, B¹, and cause or enable those controllers to vary the output of the main plants in accordance with those unsatisfied requirements.

The operation of this embodiment of the invention is as follows:

Before starting the plant, the air-condition-responsive means H and T of the two main central controllers A¹, B¹, have to be adjusted in a way to produce air conditions respectively higher and lower than those desired. The air-condition-responsive means 76—78 of the zone controllers are adjusted in the normal manner. The delayed action switches 22 and 80 have to be adjusted in accordance with the length of the duct system between the points of air-conditioning and the points of measuring. Both plants A and B are permanently in action.

With the parts in the positions shown (Fig. 5) the plant is working under stationary summer conditions. The main central controllers A¹ and B¹ (A¹ alone being shown) have established equilibrium, i. e., the levers of all make-and-break switches are in horizontal position. All the motors therefore are out of circuit, and the several regulating elements remain in the position resulting from the last preceding control operation.

The mixing damper 73 of the zone shown, is in summer, controlled by the thermostat 78 of the respective zone controller. If the temperature inside the zone becomes lower than that desired, the switch 92 closes on the lower side and thus operates motor means 73ᵃ of the mixing damper 73, with a movement which will reduce the amount of cooler air admitted from main plant B, and increase the amount of warmer air from main plant A so as to reach temperature equilibrium and yet maintain the desired quantity of air for the zone in question.

If, in the course of this action the mixing damper reaches its end position before equilibrium can be obtained, and remains there long enough to operate the two end switches 80 which are affected by that movement, those end switches will establish a current to the two corresponding tilting switches on the armature of the relay 81 of the zone controller, and such switches will, in turn, establish a current to the respective motors 96, 100 of each main controller, with the effect to expand or contract the members 24, 30 as the case may be, and by corresponding operation of the condition-responsive switches 25—29 and 32—35 re-adjust the working range of the damper 20 and mixing valve 9 of the main plant until equilibrium is again reached in the zone.

If and when the mixing valve 9 of the main control remains in its closed position and actuates its end switch 22, 22ᵃ and 22ᵇ (thereby changing the plant over to the winter working) a current will be established by the end switch 22ᵇ to the relay 81 of every zone controller and thereby place every mixing damper 73 under the influence of the respective humidostat 76 of its zone controller. With the same operation, and if the temperature of the conditioned air still decreases, below the pre-determined limit set for the thermostats 93 and switches 93ª, the switch 95 of the winter re-heating means 19 will become "live" for operation by the thermostat 94. The connections 104 and 105 lead to the corresponding parts of all the zone controllers, all the zone controllers being in parallel with each other across the feeders 104, 105.

If and when the mixing damper 73 of a zone, whilst operated by its thermostat 78 or humidostat 76 closes one or other of the branches 67, 70 of the ducts, conveying air from the main control plants and remains in this position long enough to actuate the relevant end switches 80, those switches will establish a current to the appropriate tilting switches on the armature 81ª of relay 81 of the corresponding zone controller, which switches will, in turn, establish a current to the motor means 96 or 100, as the case may be, of the main controllers, thus altering the pre-adjusted position of the humidostat H or thermostat T, resulting in an operation of the corresponding switches 25—29 or 32—35 of the main controllers.

To avoid contradictory operations on the motor means 96 and 100, from different zones, those mixing dampers 73 of zones which have very odd load conditions in one or the other way (maximum or minimum) will be fitted with one end switch 80 only. If one of these mixing dampers 73, with only one end switch 80 reaches the end position, and remains there for some time, it re-adjusts the air-condition-responsive means H and T of one main central controller only.

In the embodiment just described (Figs. 4 and 5) switching-over operations such as from summer to winter and from winter to summer occur in accordance with the following laws:

(a) The remaining of a damper 20 in the closed position long enough to actuate its end switch 22, makes the booster heaters 74 operable if operation is called for (during summer working) by the respective humidostat 76;

(b) The remaining of a damper 20 in the open position and the remaining of the cooler in the closed position long enough to actuate the respective end switches makes the pre-heater 21 operable, and conversely the remaining of the pre-heater 21 in the closed position long enough to actuate its end switch makes both the damper 20 and the cooler 9 operable;

(c) The remaining of the cooler 9 in the closed position long enough to actuate its end switches makes the re-heater 19 of the same plant operable and makes the booster heaters operable if operation is called for (during winter working) by the thermostat 78, and makes the mixing dampers operable if operation is called for (during winter working) by the humidostat 76; and (d) The remaining of the cooling device 9 away from its zero position makes the mixing dampers 73 operable if operation is called for (during summer working) by the thermostat 78.

Figure 6:
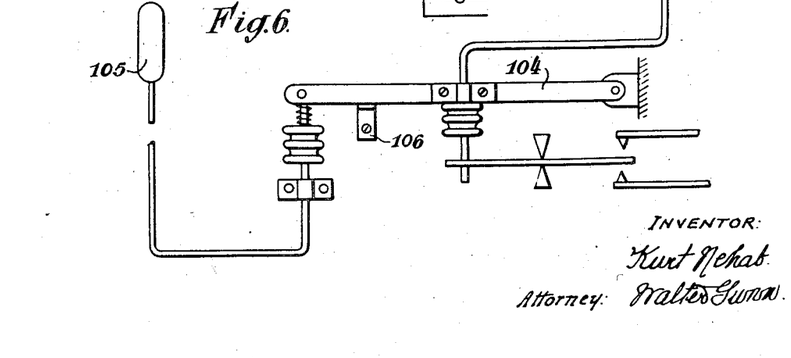
Fig. 6 illustrates a compound outside and inside condition-responsive device.

Referring finally to Fig. 6 the condition responsive device 107 is connected to the switch arms by an expansion member reacting against a pivoted rod 104 which, in turn, is influenced by the condition responsive device 105. If 107 is an inside thermostat, 105 is an outside thermostat, the variations of both are applied to the switches.

If the outside temperature falls below a given minimum, determined by the position of the stop 106, the influence of the outside thermostat during any further fall of outside temperature is removed from the lever 104.

What I claim is:

1. An air-conditioning plant including a temperature-responsive device and humidity-responsive device, the plant having means adjustable between zero and a maximum for cooling the air and means adjustable between zero and a maximum for varying the quantity of air admitted to the cooling means; and means for causing simultaneous influences of the two condition-responsive devices in the same direction from normal to effect adjustments of the cooling means and the quantity-varying means in opposite directions; and for causing simultaneous influences of the two-condition-responsive devices in opposite directions from normal to effect adjustments of the cooling means and the quantity-varying means in the same direction, said temperature-responsive device and humidity-responsive device being each operable to bring cooperative action between air tempering means and flow varying means when the other is not affected.

2. In an air-conditioning system, in combination, a conditioning chamber having an inlet and an outlet, duct means connecting said outlet with a space to be conditioned, adjustable air-condition-changing means in said chamber for changing the heat content of the air passing through the chamber, motor means for adjusting said air-condition-changing means, adjustable damper means for controlling the amount of air passing through said conditioning chamber, motor means for adjusting said damper means, duct means connecting the inlet end of the conditioning chamber with the space to be conditioned, for the re-circulation of air to the chamber from such space, and also connecting the said inlet with outside air for the admission of fresh air, by-pass means for by-passing some of the re-circulated air past the conditioning chamber, adjustable pre-heating means in the duct means where it admits outside air, motor means for adjusting such pre-heating means, and humidity and temperature responsive means in the space to be conditioned each operable at all times for control of the motor means, each humidity and temperature responsive means being operable to bring about cooperative action between said air tempering means and said damper means when the other is inoperative.

3. In an air-conditioning plant, reversibly-adjustable means for cooling the air, reversibly-adjustable means for regulating the quantity of air admitted to the cooling means, reversibly-adjustable means for re-heating the cooled air, reversibly-adjustable means for pre-heating the air to be cooled, separate motor means for effecting the adjustment of each said reversible means; a first air-condition device responsive to humidity and a second air-condition device responsive to temperature for the air to be conditioned; two sets of two-way make-and-break switches, those of one set operated by said first air-condition responsive device and those of the other set operated by such second air-condition-responsive device, one of the first set being in series with some of the second set, and one of the second set being in series with some of the first set, the others of the first set influencing the pre-heater motor and the motor of the quantity-varying means, and the others of the second set influencing the re-heater motor and the motor of the cooling device, whereby a change in temperature without change in humidity and a change in humidity without change in temperature will bring about cooperative action between the air tempering means and the flow varying means.

4. An air-conditioning plant according to claim 3, wherein those switches in the second set which are in series with one in the first set, and those in the first set which are in series with one in the second set, are pre-adjusted so as to be closed when the plant is in stationary conditions, and so that in each set at least one is closed on one side and at least one is closed on the other side.

5. In an air-conditioning system, in combination, a temperature-responsive device for a space to be conditoned, a humidity-responsive device for the same space, an adjustable cooling device subject to the simultaneous influence of both the condition-responsive devices, each of said devices being operable at all times whether the other is operating simultaneously or not, an adjustable damper also subject to the simultaneous influences of both the conditioning devices; an adjustable first re-heater, an adjustable second re-heater and an adjustable pre-heater, the first re-heater being subject directly and only to the influence of the humidity-responsive device; means for bringing the first-re-heater into operation if the damper reaches and remains in its closed position; means for bringing the second re-heater into operation if the cooling device reaches and remains in its zero position, and means for bringing the pre-heater into operation if the damper reaches and remains in its fully-open position, said temperature-responsive device and said humidity-responsive device being each operable to bring about cooperative action between air-tempering means and damper means when the other is not affected.

6. An air-conditioning plant having adjustable units for cooling, re-heating, pre-heating and regulating the amount of the air respectively, an electric motor on each unit for effecting the adjustment when energised, and an end switch on each unit with delayed-action mechanism, such end switch operating when the respective unit has reached and remained in an end position of its adjustment, and each being connected so as to make an electric motor of another unit operable to bring that unit into operation.

7. An air-conditioning plant having as units in combination a damper, a cooler, a pre-heater, a first re-heater and a second re-heater, each adjustable between zero and a maximum, an electric motor on each such unit for effecting the adjustment when energised, switch means on each unit operating when the unit reaches and remains in an end position of its adjustment, and relay mechanism operated by such switch means to make the respective motors operable and inoperable so that on the pre-heater remaining fully closed the damper will become operable; on the second re-heater remaining closed the cooler will be made operable; on the first-re-heater remaining closed the damper will be made operable; on the cooler remaining at zero the second re-heater will be made operable; and on the second re-heater remaining fully closed the cooler will be made operable, and condition-responsive devices for energising those of the motors made operable, when air conditions so require.

8. An air-conditioning plant according to claim 7 wherein the operations of the cooling device and damper so made operable are subject to the simultaneous control of a temperature-responsive device and a humidity-responsive device each of said devices being operable at all times whether the other is operating simultaneously or not for the air to be conditioned and the operations of the other units being subject to one or other but not both of those condition-responsive devices, said temperature-responsive device and said humidity-responsive device being each operable to bring about cooperative action between air-tempering means and damper means when the other is not affected.

9. An air-conditioning system for multiple-zone conditioning comprising in combination two independent main conditioning plants, each including humidostat-operated conditioning elements and thermostat-operated conditioning elements, duct means leading therefrom and connecting together for each zone, to supply a mixture from the two plants to each zone, a common return air duct from the several zones to the two plants, separate temperature-responsive devices and humidity-responsive devices in the return air duct for each plant, damper means for each zone for regulating the degree of mixing of the air from the two plants, a booster heater between each such damper means and the respective zone, and air-condition-responsive devices in each zone to control the said dampers and booster heaters.

10. An air-conditioning system for multiple-zone conditioning, comprising in combination two independent conditioning plants one of which is set to give higher, and the other lower conditions than those desired in the zones, separate duct means leading from the two plants, and having branches joining together for delivering mixed supplies to the several zones, adjustable damper means in such branches to regulate the proportions of the mixture, zone heating means between each such damper and the respective zone, end switches with delayed action mechanism to operate at the end positions of the adjustable damper, reversing switches for putting those end switches into and out of circuit with means in the plants for varying the conditioning elements of the plants, the end switches for the one end position of the damper co-operating with such means in one plant, and those for the other end position of the damper co-operating with such means in the other plant, and relay means for actuating the reversing switches, such relay means being influenced by end switch means on the cooler of at least one main plant operating in one direction when the cooler is at zero and in the other direction when the cooler moves away from zero.

11. An air-conditioning system for multiple zone control, having a main plant and control devices therefor, and having a zone control for each zone; having a re-heater in the main plant with motor means for adjusting it between zero and a maximum, having a two-way make-and-break switch for such motor means; a temperature-responsive device immediately behind such re-heater for operating such switch; and a further temperature-responsive device in each zone, any one of which may make such switch "live" if conditions in the zone so require so that it becomes effective when closed by the first-named temperature-responsive device.

12. An air-conditioning system according to claim 10, wherein each main plant includes a cooling device, means for varying the quantity of air admitted to the cooling device a pre-heater for heating the air to be cooled, and a re-heater for heating the cooled air; and wherein on the said quantity-varying means remaining fully closed the zone-heating means is made operable; on the quantity-varying means remaining fully open and the cooling device remaining at zero the pre-heater is made operable; on the pre-heater remaining at zero the damper and the cooling device are made operable; on the cooling device remaining at zero the re-heater and the zone heaters are made operable, and the mixing dampers are made operable; and on the cooling device remaining away from zero the mixing dampers are made operable.

KURT NEHAB.

REFERENCES CITED

The following references are of record in the file of this patent:

UNITED STATES PATENTS

| Number | Name | Date |
|---|---|---|
| 1,623,712 | Wood | Apr. 5, 1927 |
| 1,970,584 | Stewart | Aug. 21, 1934 |
| 2,157,685 | Anderson | May 9, 1939 |
| 2,216,475 | Metcalf | Oct. 1, 1940 |
| 2,217,680 | Haines | Oct. 15, 1940 |
| 2,246,550 | Stewart et al. | June 24, 1941 |
| 2,257,462 | Gildersleeve et al. | Sept. 30, 1941 |
| 2,258,021 | Lock | Oct. 7, 1941 |